United States Patent
Kasaiezadeh Mahabadi et al.

(10) Patent No.: US 12,304,511 B2
(45) Date of Patent: May 20, 2025

(54) VEHICLE DATA HEALTH MONITORING AND RECORDING SYSTEM FOR MULTI-LAYER CONTROL SOFTWARE ARCHITECTURE

(71) Applicant: GM Global Technology Operations LLC, Detroit, MI (US)

(72) Inventors: SeyedAlireza Kasaiezadeh Mahabadi, Novi, MI (US); Ruixing Long, Novi, MI (US); Hassan Askari, Thornhill (CA); Shamim Mashrouteh, Guelph (CA); Saurabh Kapoor, Windsor (CA); Naser Mehrabi, Richmond Hill (CA); Amir Abolhassani, Plymouth, MI (US); Mansour Ataei, Richmond Hill (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 305 days.

(21) Appl. No.: 18/063,250

(22) Filed: Dec. 8, 2022

(65) Prior Publication Data
US 2024/0190451 A1    Jun. 13, 2024

(51) Int. Cl.
*B60W 50/04*    (2006.01)
*B60W 40/02*    (2006.01)
(Continued)

(52) U.S. Cl.
CPC .......... *B60W 50/045* (2013.01); *B60W 40/02* (2013.01); *B60W 50/0205* (2013.01); *G07C 5/0808* (2013.01); *B60W 2556/45* (2020.02)

(58) Field of Classification Search
CPC .............. B60W 50/045; B60W 40/02; B60W 50/0205; B60W 2556/45; B60W 50/00;
(Continued)

(56) References Cited

U.S. PATENT DOCUMENTS

| 10,202,125 B2 | 2/2019 | Mahabadi et al. |
| 11,295,180 B1 * | 4/2022 | Tolstov .................. G06V 20/70 |

(Continued)

OTHER PUBLICATIONS

Sama et al., Multi-layer faults in the architectures of mobile, context-aware adaptive applications, Nov. 6, 2009, Elsevier, The Journal of Systems and Software 83 (2010), pp. 906-914 (Year: 2009).*

*Primary Examiner* — Sze-Hon Kong
(74) *Attorney, Agent, or Firm* — Vivacqua Crane, PLLC

(57) ABSTRACT

A data health monitoring and recording system for a vehicle includes a data recording infrastructure and one or more controllers. The one or more controllers include a multi-layer control software architecture including two or more software layers. The one or more controllers execute instructions to monitor, by a health monitoring structure that is part of the multi-layer control software architecture, one or more parameters calculated by each of the two or more software layers. The one or more controllers compare a respective parameter of a respective software layer with a predetermined corresponding performance metric for a required time horizon. In response to determining the respective parameter of the respective software layer does not meet the predetermined corresponding performance metric for the required time horizon, a trigger that instructs the data recording infrastructure to record the parameters calculated by each of the two or more software layers is generated.

18 Claims, 4 Drawing Sheets

(51) Int. Cl.
*B60W 50/02* (2012.01)
*G07C 5/08* (2006.01)

(58) Field of Classification Search
CPC ......... B60W 2050/0002; G07C 5/0808; G07C 5/008; G07C 5/085; G06F 30/20; G06F 2119/14
See application file for complete search history.

(56) References Cited

U.S. PATENT DOCUMENTS

| | | | |
|---|---|---|---|
| 11,841,761 | B2 | 12/2023 | Lin et al. |
| 2006/0064291 | A1* | 3/2006 | Pattipatti ............ G05B 23/0251 703/14 |
| 2018/0349259 | A1* | 12/2018 | Mariani ................ G06F 11/008 |
| 2020/0045568 | A1* | 2/2020 | Kwon ..................... H04W 4/40 |
| 2021/0312725 | A1* | 10/2021 | Milton ................... G07C 5/008 |
| 2022/0035359 | A1 | 2/2022 | Yu et al. |
| 2022/0206761 | A1* | 6/2022 | Kuriyama ................. G06F 8/35 |
| 2022/0242426 | A1* | 8/2022 | Kurokawa ........ B60W 50/0225 |
| 2022/0390964 | A1* | 12/2022 | Youmans ............. G05D 1/0027 |
| 2023/0339480 | A1* | 10/2023 | Yen ................... B60W 50/0225 |
| 2024/0059317 | A1* | 2/2024 | Quirynen .............. B60W 10/18 |
| 2024/0089181 | A1* | 3/2024 | Binet .................... G06F 11/202 |

* cited by examiner

VEHICLE DATA HEALTH MONITORING AND RECORDING SYSTEM FOR MULTI-LAYER CONTROL SOFTWARE ARCHITECTURE

INTRODUCTION

The present disclosure relates to a vehicle data health monitoring and recording system for one or more controllers including a multi-layer control software architecture having two or more software layers, where a trigger is generated that instructs a data recording infrastructure to record parameters calculated by the two or more software layers.

Many vehicles today are equipped with motion control systems for enhancing driver control. The motion control system includes at least one controller that typically has a multi-layer control architecture. A first layer, which is the highest software layer of the control architecture and is referred to as the level one software layer, is directed towards global control environments. The software layer immediately below the level one layer is directed towards specific local dynamics control such as, for example, axle behavior. The software layers below the local dynamic control are directed towards specific actuators and sensors responsible for vehicle motion control.

The controller of the vehicle motion control system may be monitored and assessed by a health monitoring structure. A data recording infrastructure may also be provided for recording data collected by the vehicle motion control system and other vehicle systems such as, for example, advanced driver-assistance systems (ADAS) that assist a driver in driving and parking the vehicle. The health monitoring structure monitors the data collected by the vehicle motion control system to identify when a fault occurs in the monition control system.

Once a fault is identified by the health monitoring structure, this creates a trigger that instructs the data recording infrastructure to record the data collected by the motion control system. However, the health monitoring structure may only monitor, and the data recording infrastructure may only record the data that is part of the highest software layer that is directed towards global control environments. That is, the data that part of the lower layers of the multi-layer control architecture, such as the layers that are directed towards local control, specific actuators, and sensors may not be monitored and recorded. As a result, if the failure originated at a subsystem, actuator, or sensor pertaining to one of the lower software layers, then the failure is not identified until the fault propagates to a higher software layer. Furthermore, since the data recording infrastructure only records the data pertaining to the highest software layer, there is no way to review the data pertaining to local controls, specific actuators, and sensors where a fault may have originated.

Thus, while vehicle motion control systems achieve their intended purpose, there is a need in the art for an improved approach to identifying the root cause of a fault.

SUMMARY

According to several aspects, a data health monitoring and recording system for a vehicle is disclosed. The data health monitoring and recording system includes a data recording infrastructure and one or more controllers in electronic communication with the data recording infrastructure, where the one or more controllers include a multi-layer control software architecture including two or more software layers. The one or more controllers executing instructions to monitor, by a health monitoring structure that is part of the multi-layer control software architecture, one or more parameters calculated by each of the two or more software layers. The one or more controllers compare a respective parameter calculated by a respective software layer with a predetermined corresponding performance metric for a required time horizon. In response to determining the respective parameter of the respective software layer does not meet the predetermined corresponding performance metric for the required time horizon, the one or more controllers generate a trigger that instructs the data recording infrastructure to record the parameters calculated by each of the two or more software layers.

In another aspect, each of the two or more software layers includes a respective control layer and a respective estimator layer.

In still another aspect, the health monitoring structure includes a control health monitoring layer corresponding to each of the respective control layers and an estimator health monitoring layer corresponding to each of the respective estimator layers.

In an aspect, the trigger corresponding to the control health monitoring layer is determined based a type of control system that receives the one or more parameters calculated by each of the two or more software layers.

In another aspect, the type of the control system that receives the one or more parameters is a feedback system.

In yet another aspect, the trigger is determined based on one of a target response and a reference signal.

In an aspect, the target response indicates a target vehicle state and the reference signal indicates a reference command.

In another aspect, the type of the control system that receives the one or more parameters is a feedforward system.

In still another aspect, the trigger is determined based on an expected behavior.

In an aspect, the expected behavior is determined based on one or more of the following: a vehicle state estimate, a wheel state estimate, and one or more environmental parameters.

In another aspect, the trigger corresponding to the estimator health monitoring layer is determined based a physics-based model including one or more equations that solves for the one or more parameters estimated by the respective estimator layer.

In still another aspect, the physics-based model is a lateral velocity estimation model that combines a drift-type fault detection model and a bias-type fault detection model together.

In an aspect, the trigger corresponding to the estimator health monitoring layer is determined based on a machine learning model.

In another aspect, the machine learning model receives a plurality of inputs and a reference signal, and wherein the plurality of inputs are employed by the machine learning model to calculate the reference signal and the reference signal represents one of the one or more parameters estimated by the respective estimator layer.

In still another aspect, the trigger corresponding to the estimator health monitoring layer is determined based on a combination of a physics-based model and a machine learning model together, wherein the physics-based model is employed as a constraint on a reference signal received by the machine learning model.

In an aspect, a method for monitoring a multi-layer control software architecture of one or more controllers that are part of a monitoring and recording system for a vehicle. The method includes monitoring, by a health monitoring structure that is part of the multi-layer control software architecture, one or more parameters calculated by each of two or more software layers that are part of the multi-layer control software architecture of the one or more controllers. The method includes comparing a respective parameter of a respective software layer with a predetermined corresponding performance metric for a required time horizon. Finally, in response to determining the respective parameter of the respective software layer does not meet the predetermined corresponding performance metric for the required time horizon, the method includes generating a trigger that instructs a data recording infrastructure to record the parameters calculated by each of the two or more software layers.

In an aspect, a data health monitoring and recording system for a vehicle is disclosed. The data health monitoring and recording system includes a data recording infrastructure and one or more controllers in electronic communication with the data recording infrastructure, where the one or more controllers include a multi-layer control software architecture including two or more software layers, and each of the two or more software layers includes a respective control layer and a respective estimator layer. The one or more controllers execute instructions to monitor, by a health monitoring structure that is part of the multi-layer control software architecture, one or more parameters calculated by each of the two or more software layers, where the health monitoring structure includes a control health monitoring layer corresponding to each of the respective control layers and an estimator health monitoring layer corresponding to each of the respective estimator layers. The one or more controllers compare a respective parameter calculated by a respective software layer with a predetermined corresponding performance metric for a required time horizon. In response to determining the respective parameter of the respective software layer does not meet the predetermined corresponding performance metric for the required time horizon, the one or more controllers generate a trigger that instructs the data recording infrastructure to record the parameters calculated by each of the two or more software layers.

In another aspect, the trigger corresponding to the control health monitoring layer is determined based a type of control system that receives the one or more parameters calculated by each of the two or more software layers.

In still another aspect, the trigger corresponding to the estimator health monitoring layer is determined based a physics-based model including one or more equations that solves for the one or more parameters estimated by the respective estimator layer.

In an aspect, the trigger corresponding to the estimator health monitoring layer is determined based on a machine learning model.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
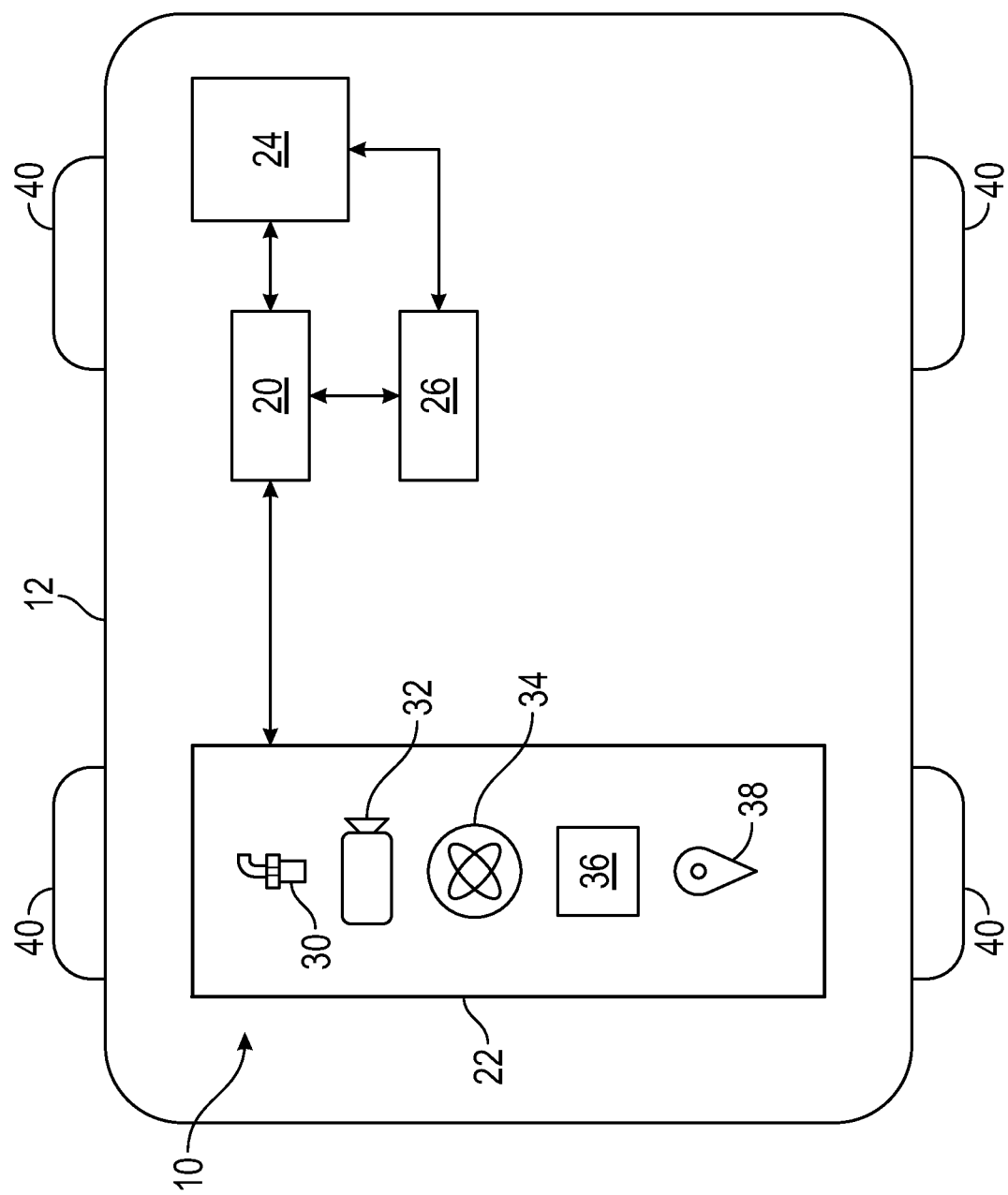
FIG. 1 is a schematic diagram of a vehicle including the disclosed data health monitoring and recording system including one or more controllers and a data recording structure, according to an exemplary embodiment.

Referring to FIG. 1, an exemplary data health monitoring and recording system 10 for a vehicle 12 is illustrated. It is to be appreciated that the vehicle 12 may be any type of vehicle such as, but not limited to, a sedan, truck, sport utility vehicle, van, or motor home. The data health monitoring and recording system 10 includes one or more controllers 20 in electronic communication with a plurality of sensors 22 configured to monitor data indicative of a dynamic state of the vehicle 12. In the non-limiting embodiment as shown in FIG. 1, the plurality of sensors 22 include one or more wheel speed sensors 30 for measuring an angular wheel speed velocity of one or more wheels 40 of the vehicle 12, one or more cameras 32, an inertial measurement unit (IMU) 34, one or more steering angle sensors 36, and a global positioning system (GPS) 38, however, is to be appreciated that additional sensors may be used as well. The one or more controllers 20 are also in electronic communication with a data recording infrastructure 24 and one or more vehicle control systems 26. Some examples of vehicle control systems 26 include, but are not limited to, an electronic all-wheel-drive (eAWD) system and an electronic limited slip differential (eLSD) system.

Figure 2:
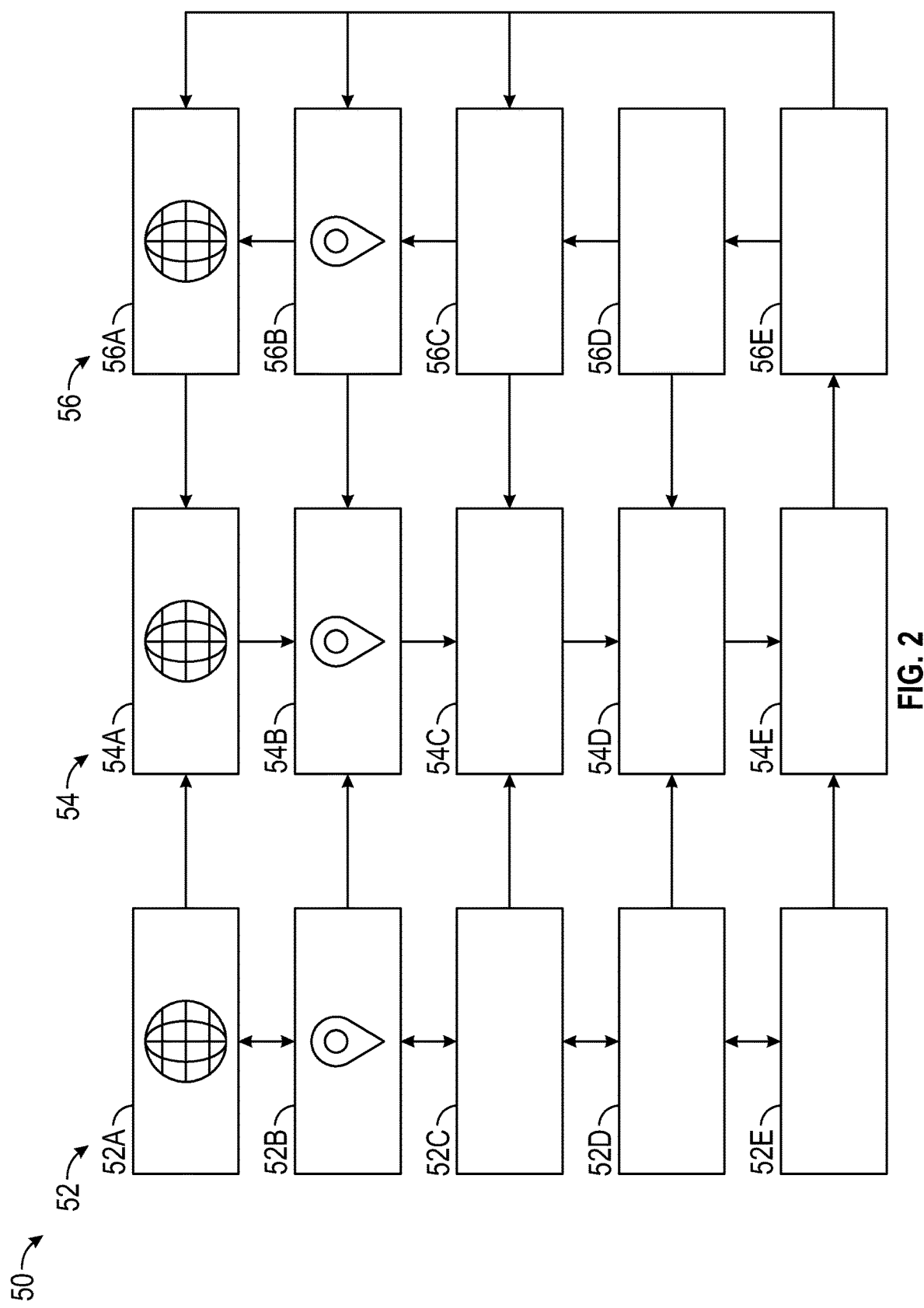
FIG. 2 is a diagram of a multi-layer control software architecture of the one or more controllers shown in FIG. 1, according to an exemplary embodiment.

The one or more controllers 20 include a tiered or multi-layer control software architecture 50 that includes two or more software layers 52 (shown in FIG. 2). It is to be appreciated that while the data health monitoring and recording system 10 is illustrated as part of a motion control system for the vehicle 12, the figures are merely exemplary in nature and the data health monitoring and recording system 10 is not limited to a vehicle motion controller. Indeed, the data health monitoring and recording system 10 may be implemented in any application that employs multi-layer control software architecture.

FIG. 2 is a diagram of the multi-layer control software architecture 50 that includes two or more software layers 52 of the one or more controllers 20 shown in FIG. 1. Specifically, the multi-layer control software architecture 50 includes a global layer 52A, a local layer 52B, an actuator requirement layer 52C, a local actuator dynamics level 52D, and a hardware layer 52E. The global layer 52A corresponds to a first level of the multi-layer control software architecture 50 and controls overall vehicle dynamic functions. The local layer 52B controls local dynamic functions that are specific to one of the vehicle control systems 26, such as the eAWD system of the eLSD system. The actuator requirement layer 52C corresponds to a specific actuator that is part of one of the vehicle control systems 26 of the vehicle 12. The local actuator dynamics level 52D controls actuator dynamic functions, and the hardware layer 52E monitors the data indicative of the dynamic state of the vehicle 12 from the plurality of sensors 22 (FIG. 1).

Each software layer 52 includes a respective control layer 54 and a respective estimator layer 56, where the respective control layer 54 and the respective estimator layer 56 for a specific software layer 52 are in communication with the remaining software layers 52 that are part of the multi-layer control software architecture 50. The control layer 54 calculates a target action based on the data indicative of the dynamic state of the vehicle 12 from the plurality of sensors 22 (FIG. 1) and the estimator layer 56 estimates a dynamic state of the vehicle 12 based on the data indicative of the dynamics state of the vehicle 12 from the plurality of sensors 22. The global layer 52A of the two or more software layers 52 includes a global control layer 54A and a global state estimator layer 56A. The global control layer 54A calculates one or more parameters that indicate a target action that the vehicle 12 executes at a global control point. Some examples of the parameters that indicate the target actions at global control points include, but are not limited to, target longitudinal acceleration, target longitudinal velocity, target slip tracking, target lateral acceleration, target velocity, and target yaw rate tracking. The global state estimator layer 56A calculates one or more parameters that indicate a global state of the vehicle 12 at the global control point. Some examples of the parameters that indicate the global state of the vehicle 12 include, but are not limited to, a longitudinal acceleration estimate, a longitudinal velocity estimate, a longitudinal slip, a lateral velocity estimate, and a lateral acceleration estimate.

The local layer 52B includes a local dynamics control layer 54B and a local dynamics state estimation layer 56B. The local dynamics control layer 54B calculates one or more parameters that indicate a target action that the vehicle 12 executes at a local control point. Some examples of the target actions at the local control points include, but are not limited to, wheel control, active down force control, eAWD control, eLSD control, and active rear-wheel steering (ARS) control. The local dynamics state estimation layer 56B calculates one or more parameters indicating a local dynamics state at the local control point. Some examples of the local dynamics state of the vehicle 12 include, but are not limited to, a body state estimate, wheel state estimate, road state estimate, and tire force estimate.

The actuator requirement layer 52C includes an actuator control layer 54C and an actuation state estimation layer 56C. The actuator control layer 54C calculates one or more parameters that indicate a target action executed by a target actuator. Some examples of the target action executed by the target actuator include, but are not limited to, eLSD torque commands, gurney commands, rear wing commands, steering commands, engine commands, and electric motor commands. The actuation state estimation layer 56C calculates one or more parameters indicating a state of the target actuator. Some examples of the state of the actuator include, but are not limited to, an actuator based estimate, a sensor based estimate, and a corner torque.

The local actuator dynamics level 52D includes a local actuator dynamics actuator control layer 54D and a local actuator dynamics state estimation layer 56D. The local actuator dynamics actuator control layer 54D calculates one or more parameters that indicate a target variable created by the target actuator. Some examples of the target variable generated by the target actuator include current and voltage values. Specifically, in an embodiment, some examples of the target variable include, but are not limited to, delivered eLSD torque, delivered down force, delivered axle torque, and delivered wheel torque. The local actuator dynamics state estimation layer 56D calculates one or more parameters indicating a local actuator state of the target actuator. Some examples of the local actuator dynamics state of the target actuator include, but are not limited to, steering angle, steering torque, and wheel velocity. Finally, the hardware layer 52E includes hardware 54E and a sensor processing layer 56E. The hardware 54E includes sensors, such as the plurality of sensors 22 shown in FIG. 1, where the hardware 54E collects and sends variables that indicate the dynamic state of the vehicle 12 to the sensor processing layer 56E.

Figure 3:
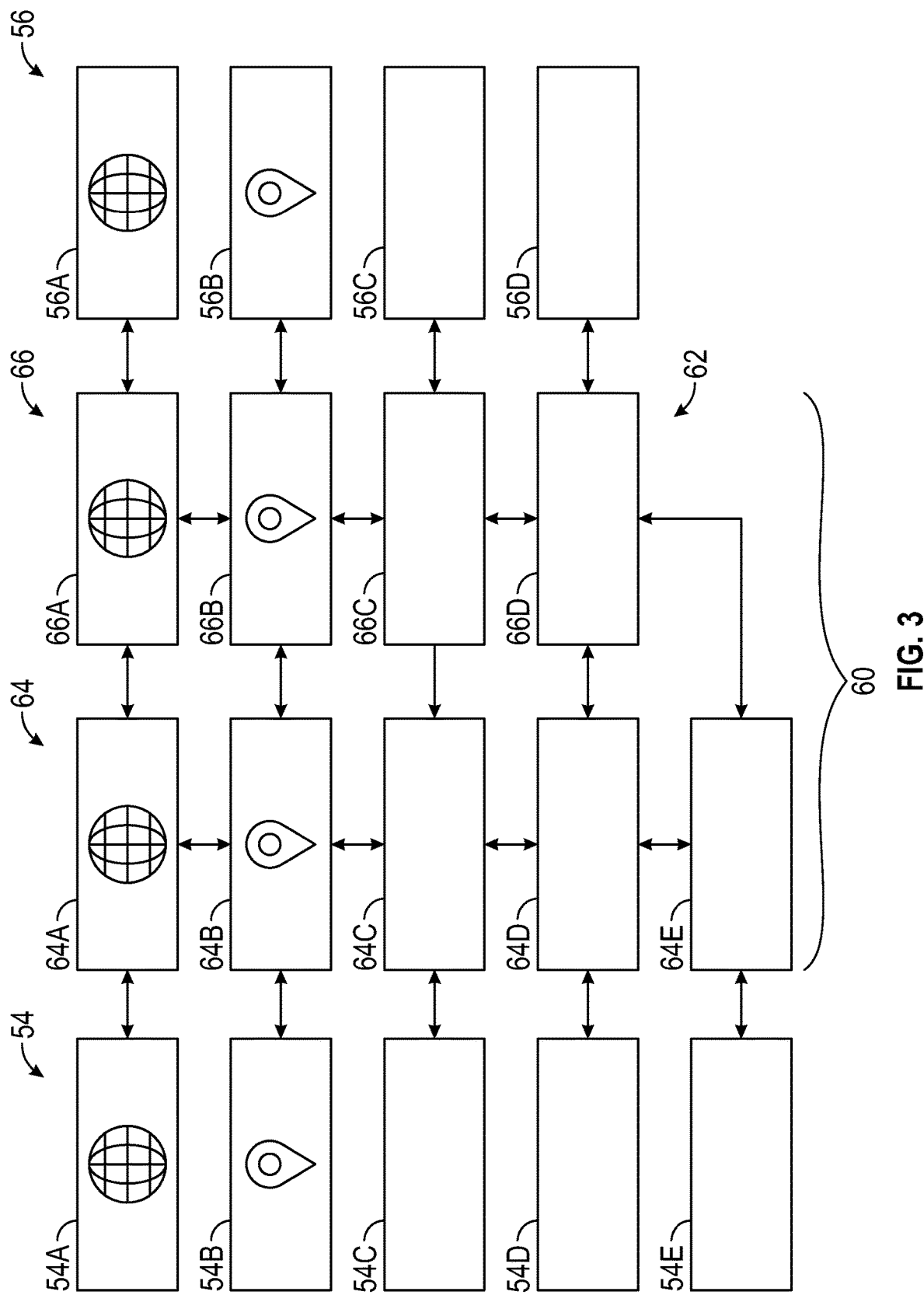
FIG. 3 is a diagram of a health monitoring structure for monitoring the multi-layer control software architecture shown in FIG. 2, according to an exemplary embodiment.

Referring now to FIG. 3, the multi-layer control software architecture 50 also includes a health monitoring structure 60 that monitors the software layers 52 of the multi-layer control software architecture 50 of the one or more controllers 20. As explained below, the health monitoring structure 60 monitors the software layers 52 and compares a respective parameter of a respective software layer 52 with a predetermined corresponding performance metric for a required time horizon. In response to determining the respective parameter of the respective software layer 52 does not meet the predetermined corresponding performance metric for the required time horizon, the health monitoring structure 60 generates a trigger that instructs the data recording infrastructure 24 (shown in FIG. 1) to record the one or more parameters calculated by each of the two or more software layers 52. Therefore, it follows that each software layer 52 of the multi-layer control software architecture 50 is monitored by the health monitoring structure 60, which in turn allows for an entire sequence of events to be detected and recorded by the data recording infrastructure 24.

The health monitoring structure 60 includes a plurality of health software layers 62 that each correspond to each of the respective software layers 52 of the multi-layer control software architecture 50 shown in FIG. 2. Referring to both FIGS. 2 and 3, the health monitoring structure 60 includes a control health monitoring layer 64 that corresponds to the control layer 54. Specifically, the control health monitoring layer 64 includes a global control health monitoring layer 64A, a local dynamics control health monitoring layer 64B, an actuator control health monitoring layer 64C, a local actuator dynamics control health monitoring layer 64D, and a hardware health monitoring layer 64E. The global control health monitoring layer 64A monitors the parameters that indicate the target actions at global control points generated by the global control layer 54A. The local dynamics control health monitoring layer 64B monitors the one or more parameters that indicate the target action that the vehicle 12 executes at the local control point generated by the local dynamics control layer 54B. The actuator control health monitoring layer 64C monitors the target actions at the actuator generated by the actuator control layer 54C. The local actuator dynamics control health monitoring layer 64D monitors the one or more parameters that indicate the target variable generated by the target actuator generated by the local actuator dynamics actuator control layer 54D. Finally, the hardware health monitoring layer 64E monitors a health of the hardware 54E, which includes the plurality of sensors 22 shown in FIG. 1. It is to be appreciated that the global control health monitoring layer 64A, the local dynamics control health monitoring layer 64B, the actuator control health monitoring layer 64C, the local actuator dynamics control health monitoring layer 64D, and the hardware health monitoring layer 64E each include one or more unique triggers.

The health monitoring structure 60 includes an estimator health monitoring layer 66 that corresponds to the estimator layer 56. Specifically, the estimator health monitoring layer 66 includes a global state estimation health monitoring layer 66A, a local dynamics state estimation health monitoring layer 66B, an actuator state estimation health monitoring layer 66C, and a local actuator dynamics state estimation health monitoring layer 66D. The global state estimation health monitoring layer 66A monitors the one or more parameters that indicate the global state of the vehicle 12 at the global control point calculated by the global state estimator layer 56A. The local dynamics state estimation health monitoring layer 66B monitors the one or more parameters indicating the local dynamics state at the local control point calculated by the local dynamics state estimation layer 56B. The actuator state estimation health monitoring layer 66C monitors the one or more parameters indicating the state of the target actuator calculated by the actuation state estimation layer 56C. The local actuator dynamics state estimation health monitoring layer 66D monitors the one or more parameters indicating the local actuator state of the target actuator calculated by the local actuator dynamics state estimation layer 56D. The local actuator dynamics state estimation health monitoring layer 66D also monitors a health of the hardware health monitoring layer 64E. It is to be appreciated that the global state estimation health monitoring layer 66A, the local dynamics state estimation health monitoring layer 66B, the actuator state estimation health monitoring layer 66C, and the local actuator dynamics state estimation health monitoring layer 66D each include one or more unique triggers.

Determination of the trigger that instructs the data recording infrastructure 24 (shown in FIG. 1) to record the one or more parameters calculated by each of the two or more software layers 52 shall now be described. Referring generally to FIGS. 1-3, the trigger corresponding to the control health monitoring layer 64 of the health monitoring structure 60 is described. The trigger corresponding to the control health monitoring layer 64 is determined based a type of control system that receives the one or more parameters calculated by each of the two or more software layers 52 (FIG. 2). Specifically, the type of the control system that receives the one or more parameters is either a feedback system or a feedforward system. One example of a feedback control is a yaw tracking control system, where a control action is proportional to yaw rate error. One example of a feedforward control is a torque vectoring command to generate a yaw moment that is determined based on the steering angle rate.

If the type of the control system that receives the one or more parameters is a feedback system, then the trigger is determined based on one of a target response and a reference signal. The target response indicates a target vehicle state, and the reference signal indicates a reference command. Some examples of the target vehicle state include, but are not limited to, target yaw rate and target side slip angle. Some examples of the reference command include, but are not limited to, axle reference torque and the torque vectoring command to generate the yaw moment. If the type of the control system that receives the one or more parameters is a feedforward system, then the trigger is determined based on an expected behavior. The expected behavior is determined based on one or more of the following: a vehicle state estimate, a wheel state estimate, and one or more environmental parameters. Some examples of environmental parameters include, but are not limited to, road angles and road conditions.

Continuing to refer to FIGS. 1-3, the trigger corresponding to the estimator health monitoring layer 66 of the health monitoring structure 60 is described. The trigger corresponding to the estimator health monitoring layer 66 is determined based on a physics-based model, a machine learning model 70 (shown in FIG. 4), or a hybrid model that is a combination of the physics-based model and the machine learning model 70. It is to be appreciated that the one or more controllers 20 do not have access to ground truth measurements that correspond to the one or more parameters. Instead, only input and output variables are available. The physics-based model is a white box model, since knowledge of the internal structure of the physics-based model is known. The machine learning model is a black box model since only the inputs and outputs are known, and the hybrid model is a gray box model.

The physics-based model includes one or more equations that solve for the one or more parameters estimated by a respective estimator layer 56. The number of equations in the physics-based model depend upon a number of degrees of freedom. One example of the physics-based model is a lateral velocity estimation model that combines a drift-type fault detection model and a bias-type fault detection model together. The drift-type fault detection model determines a drift-type fault, which is sometimes referred to as a slope-type fault, that manifests in an estimated lateral velocity $\hat{V}y$ over time. The bias-type fault detection model is a pneumatic trail bias-type fault detection model that determines an expected slip angle. The bias-type fault detection model estimates a pneumatic trail based on, or as a function of, self-aligning torque and lateral forces. It is to be appreciated that the bias-type fault detection model determines the expected slip angle independently of the estimated lateral velocity $\hat{V}y$. The expected slip angle is then utilized to determine a vertical bias in the estimated lateral velocity $\hat{V}y$. The lateral velocity estimation model generates a fault flag when both the drift-type fault and the bias-type fault are both present. It is to be appreciated that while a lateral velocity estimation model is described, the physics-based model may detect faults in other types of estimates as well.

Figure 4:
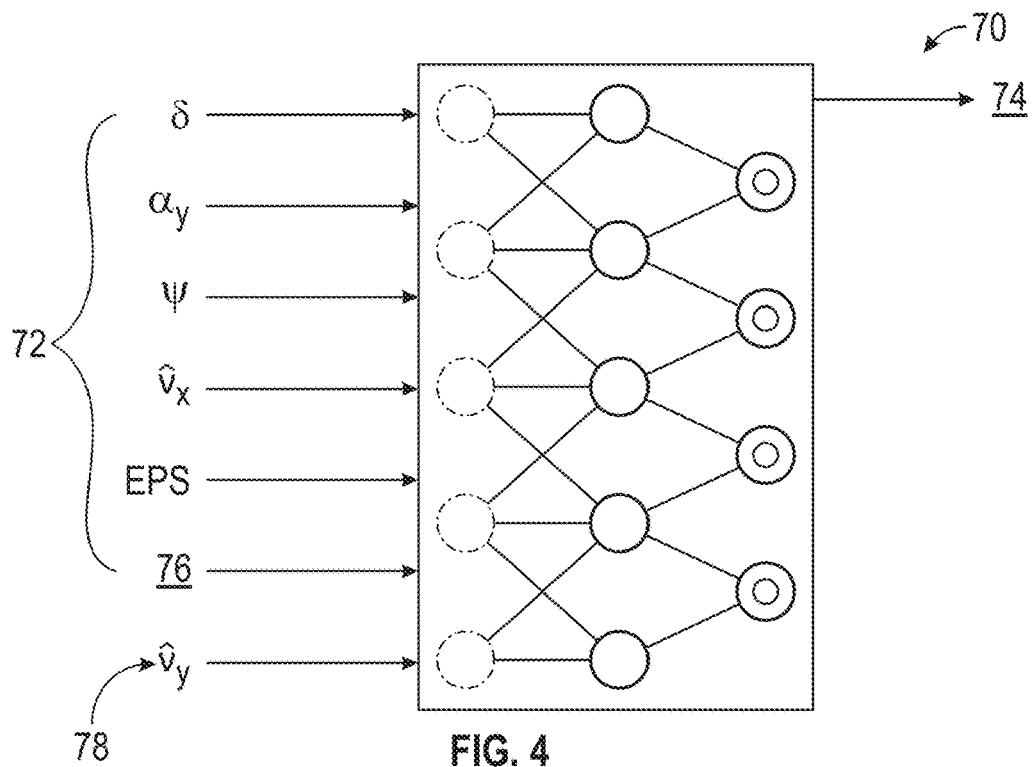
FIG. 4 is a diagram of a machine learning model employed by the health monitoring structure that determines a trigger.

Referring to FIGS. 1 and 4, in another embodiment the trigger corresponding to the estimator health monitoring layer 66 (FIG. 3) is determined based on the machine learning model 70. In the example as shown in FIG. 4, the machine learning model 70 employs a neural network, however, it is to be appreciated that other machine learning techniques may be used as well. In the example as shown in FIG. 4, the machine learning model 70 receives a plurality of inputs 72 and a reference signal 78, where the plurality of inputs 72 are employed by the machine learning model 70 to calculate the reference signal 78 and the reference signal 78 represents one of the one or more parameters estimated by the respective estimator layer 56, which is the estimated lateral velocity $\hat{V}y$ in the present example. The machine learning model 70 generates a health indicator 74 that indicates a health of the reference signal 78, which is the estimated lateral velocity $\hat{V}y$. In the present example, the plurality of inputs 72 include a steering angle $\delta$, lateral acceleration $a_y$, yaw rate $\dot{\psi}$, longitudinal velocity $\hat{V}_x$, an electric power steering torque feedback EPS, and positional data 76 collected from the GPS 38 (FIG. 1). The machine learning model 70 is trained to determine the health indicator 74 by injecting predetermined noise or potential root causes of faults into the system as the plurality of inputs 72, and observing the output, which is the health indicator 74 of the reference signal 78.

As mentioned above, the hybrid model is a combination the physics-based model and the machine learning model 70 together, where the physics-based model is employed as a constraint for the reference signal 78 received by the machine learning model 70. For example, a physics-based model may be used to calculate the estimated lateral velocity $\hat{V}y$ in the example as shown in FIG. 4 using the following equation: $\hat{V}y = a_y - \dot{\psi} \times \hat{V}_x$.

Figure 5:
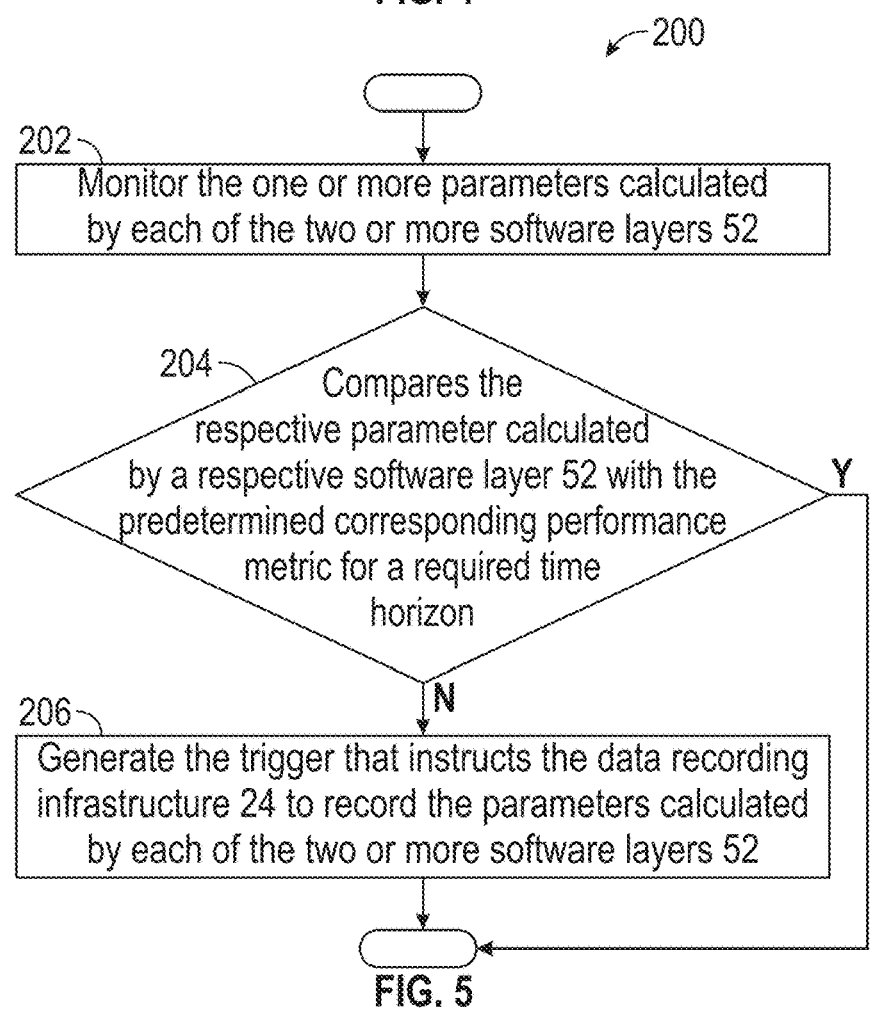
FIG. 5 process flow diagram illustrating a method for monitoring the multi-layer control software architecture by the monitoring and recording system shown in FIG. 1, according to an exemplary embodiment.

FIG. 5 is an exemplary process flow diagram illustrating a method 200 for monitoring the multi-layer control software architecture 50 (FIG. 2) of the one or more controllers 20 by the monitoring and recording system 10 shown in FIG. 1. Referring generally to FIGS. 1-5, the method 200 may begin at block 202. In block 202, the health monitoring structure 60 that is part of the multi-layer control software architecture 50 monitors the one or more parameters calculated by each of the two or more software layers 52. The method 200 may then proceed to decision block 204.

In decision block 204, the health monitoring structure 60 compares the respective parameter calculated by a respective software layer 52 with the predetermined corresponding performance metric for a required time horizon. If the respective parameter of the respective software layer 52 meets the predetermined corresponding performance metric for the required time horizon, then no fault has occurred. Accordingly, the method 200 may then terminate. However, in response to determining the respective parameter of the respective software layer does not meet the predetermined corresponding performance metric for the required time horizon, then the method 200 proceed to block 206.

In block 206, the trigger that instructs the data recording infrastructure 24 to record the parameters calculated by each of the two or more software layers 52 that are part of the multi-layer control software architecture 50 is generated. The method 200 may then terminate.

Referring generally to the figures, the disclosed monitoring and recording system provides various technical effects and benefits. Specifically, the health monitoring structure of the monitoring and recording system monitors each of the software layers that are part of the multi-layer control software architecture of the controller to detect when a fault occurs. In response to detecting a fault, the health monitoring structure may generate a trigger that instructs the data recording structure to record the parameters calculated by each software layer of the controller. Accordingly, the fault may be traced as the fault propagates through the controller software architecture, thereby enabling root cause analysis. In contrast, conventional health monitoring structure may only monitor, and conventional data recording systems may only record data that is part of the highest software layer.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A data health monitoring and recording system for a vehicle, the data health monitoring and recording system comprising:
   a data recording infrastructure; and
   one or more controllers in electronic communication with the data recording infrastructure, wherein the one or more controllers include a multi-layer control software architecture including two or more software layers, wherein each of the two or more software layers includes a respective control layer and a respective estimator layer, the one or more controllers executing instructions to:
   monitor, by a health monitoring structure that is part of the multi-layer control software architecture, one or more parameters calculated by each of the two or more software layers, wherein the health monitoring structure includes a control health monitoring layer corresponding to each of the respective control layers and an estimator health monitoring layer corresponding to each of the respective estimator layers;
   compare a respective parameter calculated by a respective software layer with a predetermined corresponding performance metric for a required time horizon;
   in response to determining the respective parameter of the respective software layer does not meet the predetermined corresponding performance metric for the required time horizon, generate a trigger that instructs the data recording infrastructure to record the parameters calculated by each of the two or more software layers, wherein the trigger corresponding to the control health monitoring layer is determined based on a type of control system that receives the one or more parameters calculated by each of the two or more software layers; and
   record, by the data recording infrastructure, the parameters calculated by each of the two or more software layers that are part of the multi-layer control software architecture to trace a fault that propagates though the multi-layer control software architecture;
   wherein each of the respective control layers calculates a target action based on data indicative of a dynamic state of the vehicle;
   wherein a global control layer of the two or more software layers calculates one or more parameters that indicate the target action that the vehicle executes at a global control point.

2. The data health monitoring and recording system of claim 1, wherein the type of the control system that receives the one or more parameters is a feedback system.

3. The data health monitoring and recording system of claim 2, wherein the trigger is determined based on one of a target response and a reference signal.

4. The data health monitoring and recording system of claim 3, wherein the target response indicates a target vehicle state and the reference signal indicates a reference command.

5. The data health monitoring and recording system of claim 1, wherein the type of the control system that receives the one or more parameters is a feedforward system.

6. The data health monitoring and recording system of claim 5, wherein the trigger is determined based on an expected behavior.

7. The data health monitoring and recording system of claim 6, wherein the expected behavior is determined based on one or more of the following: a vehicle state estimate, a wheel state estimate, and one or more environmental parameters.

8. The data health monitoring and recording system of claim 1, wherein the trigger corresponding to the estimator health monitoring layer is determined based on a physics-based model including one or more equations that solves for the one or more parameters estimated by the respective estimator layer.

9. The data health monitoring and recording system of claim 8, wherein the physics-based model is a lateral velocity estimation model that combines a drift-type fault detection model and a bias-type fault detection model together.

10. The data health monitoring and recording system of claim 1, wherein the trigger corresponding to the estimator health monitoring layer is determined based on a machine learning model.

11. The data health monitoring and recording system of claim 10, wherein the machine learning model receives a plurality of inputs and a reference signal, and wherein the plurality of inputs are employed by the machine learning model to calculate the reference signal and the reference signal represents one of the one or more parameters estimated by the respective estimator layer.

12. The data health monitoring and recording system of claim 1, wherein the trigger corresponding to the estimator health monitoring layer is determined based on a combination of a physics-based model and a machine learning model together, wherein the physics-based model is employed as a constraint on a reference signal received by the machine learning model.

13. The data health monitoring and recording system of claim 1, wherein the one or more parameters that indicate the target action at the global control point include one or more of the following: target longitudinal acceleration, target longitudinal velocity, target slip tracking, target lateral acceleration, target velocity, and target yaw rate tracking.

14. A method for monitoring a multi-layer control software architecture of one or more controllers that are part of a monitoring and recording system for a vehicle, the method comprising:

monitoring, by a health monitoring structure that is part of the multi-layer control software architecture, one or more parameters calculated by each of two or more software layers that are part of the multi-layer control software architecture of the one or more controllers, wherein each of the two or more software layers includes a respective control layer and a respective estimator layer, and wherein the health monitoring structure includes a control health monitoring layer corresponding to each of the respective control layers and an estimator health monitoring layer corresponding to each of the respective estimator layers;

comparing a respective parameter of a respective software layer with a predetermined corresponding performance metric for a required time horizon; and in response to determining the respective parameter of the respective software layer does not meet the predetermined corresponding performance metric for the required time horizon, generating a trigger that instructs a data recording infrastructure to record the parameters calculated by each of the two or more software layers, wherein the trigger corresponding to the control health monitoring layer is determined based on a type of control system that receives the one or more parameters calculated by each of the two or more software layers; and recording, by the data recording infrastructure, the parameters calculated by each of the two or more software layers that are part of the multi-layer control software architecture to trace a fault that propagates though the multi-layer control software architecture;

wherein each of the respective control layers calculates a target action based on data indicative of a dynamic state of the vehicle;

wherein a global control layer of the two or more software layers calculates one or more parameters that indicate the target action that the vehicle executes at a global control point.

15. A data health monitoring and recording system for a vehicle, the data health monitoring and recording system comprising:

a data recording infrastructure; and one or more controllers in electronic communication with the data recording infrastructure, wherein the one or more controllers include a multi-layer control software architecture including two or more software layers, and wherein each of the two or more software layers includes a respective control layer and a respective estimator layer, the one or more controllers executing instructions to:

monitor, by a health monitoring structure that is part of the multi-layer control software architecture, one or more parameters calculated by each of the two or more software layers, wherein the health monitoring structure includes a control health monitoring layer corresponding to each of the respective control layers and an estimator health monitoring layer corresponding to each of the respective estimator layers;

compare a respective parameter calculated by a respective software layer with a predetermined corresponding performance metric for a required time horizon;

in response to determining the respective parameter of the respective software layer does not meet the predetermined corresponding performance metric for the required time horizon, generate a trigger that instructs the data recording infrastructure to record the parameters calculated by each of the two or more software layers; and record, by the data recording infrastructure, the parameters calculated by each of the two or more software layers that are part of the multi-layer control software architecture to trace a fault that propagates though the multi-layer control software architecture;

wherein each of the respective control layers calculates a target action based on data indicative of a dynamic state of the vehicle;

wherein a global control layer of the two or more software layers calculates one or more parameters that indicate the target action that the vehicle executes at a global control point.

16. The data health monitoring and recording system of claim 15, wherein the trigger corresponding to the control health monitoring layer is determined based on a type of control system that receives the one or more parameters calculated by each of the two or more software layers.

17. The data health monitoring and recording system of claim 15, wherein the trigger corresponding to the estimator health monitoring layer is determined based on a physics-based model including one or more equations that solves for the one or more parameters estimated by the respective estimator layer.

18. The data health monitoring and recording system of claim 15, wherein the trigger corresponding to the estimator health monitoring layer is determined based on a machine learning model.

* * * * *